United States Patent [19]

Guillon et al.

[11] Patent Number: 4,969,294
[45] Date of Patent: Nov. 13, 1990

[54] SEALING STRIP FOR MOVEABLE GLASS COMPONENTS, NOTABLY CAR WINDOWS

[75] Inventors: Henri Guillon, Vaux-sur-Seine; Hervé Malnoult, Luce, both of France

[73] Assignee: Hutchinson, Paris, France

[21] Appl. No.: 398,162

[22] Filed: Aug. 24, 1989

[30] Foreign Application Priority Data

Aug. 25, 1988 [FR] France .................................. 88 11223

[51] Int. Cl.⁵ ............................................... E06B 7/16
[52] U.S. Cl. ........................................ 49/495; 49/440; 49/491
[58] Field of Search ............... 491/374, 377, 440, 484, 491/490, 491, 496, 495

[56] References Cited

U.S. PATENT DOCUMENTS

| | | | |
|---|---|---|---|
| 2,083,353 | 6/1937 | Tannewitz | 49/440 |
| 2,758,871 | 8/1956 | Gray | 49/440 |
| 3,359,688 | 12/1967 | Konolf | 49/490 |
| 4,318,249 | 3/1982 | Landreth | 49/490 |
| 4,424,647 | 1/1984 | Sasaki et al. | 49/377 X |
| 4,800,681 | 1/1989 | Skillen et al. | 49/440 |

FOREIGN PATENT DOCUMENTS 3442840 6/1985 Fed. Rep. of Germany ........ 49/441
2555698 11/1984 France .

Primary Examiner—Gary L. Smith
Assistant Examiner—Jerry Redman
Attorney, Agent, or Firm—Bell, Seltzer, Park & Gibson

[57] ABSTRACT

A waterproof sealing strip is disclosed which is adapted for sealing a moveable glass pane of a vehicle. The sealing strip includes a body having a pair of leg portions extending in opposing spaced-apart relation to form a clamp for mounting the strip to a vehicle. A first portion of the body has a flock coating of textile fibers for engaging the face of the pane. A second portion of the body has a second surface coating harder than the flock coating and having a low coefficient of friction also for engaging the pane and assisting in sliding movement of this glass pane.

4 Claims, 2 Drawing Sheets

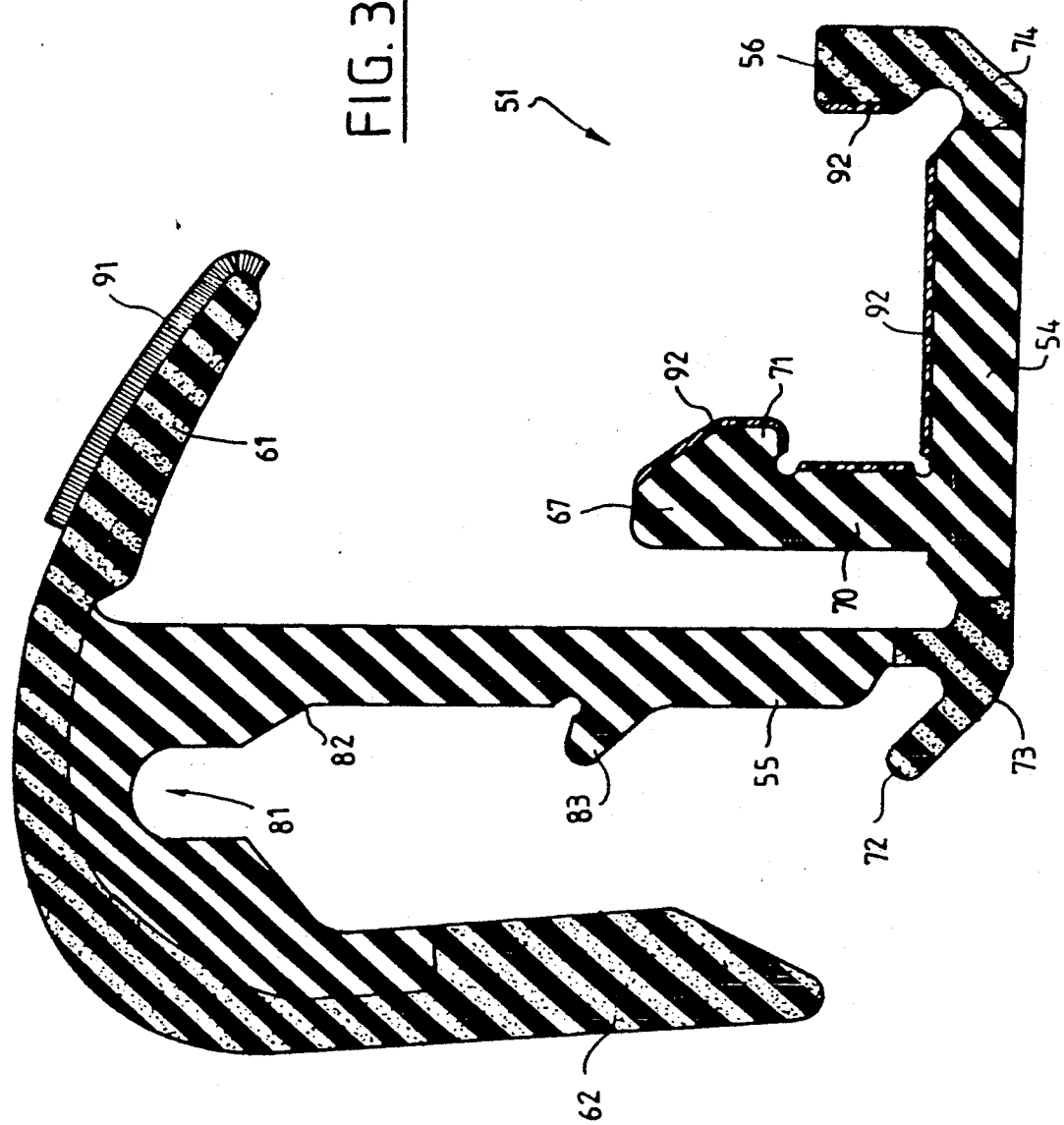

SEALING STRIP FOR MOVEABLE GLASS COMPONENTS, NOTABLY CAR WINDOWS

The invention aims to provide a waterproofing strip for moveable glass components, notably car windows.

There are many well known types of weatherstrips for car windows which are mounted either on the framework of the car door and known in French as "coulisses de glace" (window slides/runners) when they actually form the upper and lateral casing for the window to be opened or closed, or "profil d'étanchéité de bas de glace" (weatherstrip for lower part of window) or "lécheurs" (literally "(window) licker") if they run along the bottom of the window. Although the main purpose of the "lickers" and the window runners is to provide protection from water and wind they also have other functions. As well as providing protection therefore the window runners also assist in guiding the movement of the window. This is not expected of the "lickers" however which are nonetheless expected to contribute to the aesthetic appearance of the vehicle projecting as little as possible from the edge of the window.

The solutions brought to these problems in the past have concentrated on the development of weatherstrips with one or two natural or synthetic rubber sealing lips supported by a projection or a usually U-shaped mould, depending on whether they are to be used with "lickers" or window runners in the areas where the lips adhere or are shaped to lie flat on the moveable surface.

However, since applying this kind of lip to the glass has a tendency to reduce the smoothness of sliding it was suggested that the surface of the lip could be coated with a substance which might have good sliding properties.

To this end therefore the sealing lips of some "lickers" and some window runners were coated by a process of flock coating with a layer of textile fibre to form a velvet-like coating. However, despite the fact that this kind of treatment improves the sliding smoothness of the windows, the lips which were thus treated soon lost this quality because the coating was rapidly worn down. These lips were therefore replaced by lips coated with a "sliding agent" which formed a continuous layer of polyolefine, polytetrafluorethylene, or of any other material, usually synthetic, with resistance to wear by friction and ensuring good levels of protection against water and wind while having good sliding properties. However this solution is not entirely satisfactory because it accentuates the risk of glass becoming scratched by particles of dust which are both unaesthetic and weakening for the glass itself.

The invention therefore aims to provide a weatherproofing device for window runners or "lickers" running along the bottom of moveable car windows, which is easy and inexpensive to produce and which, whilst offering good protection from water and good acoustic insulation, does not damage the windows around which it is applied.

The problem is resolved by a weatherstrip having at least one sealing lip in a window runner or "licker". The combined action of these two kinds of coating assists in reducing the wearing of the flock coating, hereinafter referred to as "soft coating" to distinguish it from the aforementioned coating which shall be referred to as "hard coating".

When applied to sealing lips the soft coating retains the dust and reduces the pressure of the hard coating thus reducing the risk of scratching by dust particles and the pressure exerted by the hard coating on the glass, whilst the continuous surface of a "hard" coating on the edges of the lip or on other parts of the waterproofing device ensures precision of movement as well as constant waterproofness.

A waterproofing device for moveable windows having one body and at least one sealing lip is characterized, according to the invention, by the pressure of a first soft coating, applied by flock coating of textile fibres or hairs on the sealing lip or at least over most of the surface of the lip which will be in contact with the glass when it is slid up or down, and of a second harder coating to produce an even surface of for example polyolefine or polytetrafluorethylene on the edges of the lip and/or other parts of the device which assist in guiding the movement of the window, usually made of a plastic material.

The edge of the lip only exerts a very weak pressure on the window, just enough to ensure waterproofness assisted by the flock coated part of the coating, and the risks of scratching are therefore considerably reduced mainly because the parts of the device which are in contact with the glass are coated in a sliding agent. The pressure exerted by the edge of the lip may decrease slightly as the glass emerges from the "licker" and approaches the weatherstrip. The elasticity of the lip is very weak and practically transversal to the level of the edge. However this pressure remains sufficient to prevent premature wearing of the flock coating.

This combination of coatings therefore ensures waterproofness while preventing glass from being scratched thanks to the very weak pressure exerted by the edge of the lip on the glass and also thanks to the shock absorbing effect of the sealing lip given its suppleness and geometric form.

The first and second coatings may or may not be contiguous.

Preferably the lip should be mounted on a $\pi$-shaped squeezing device or heel, possibly having an armature as well being fitted with clamps to attach the device to the bodywork as described in the French Patent Application in the name of the applicant submitted on 1st Mar. 1988 and issued number 88.02523. The base of the lip is fixed to the core of the heel.

Another version of the invention applicable where weatherstrips are to be used as window runners, is obtained by coating the lip(s) with a soft coating whilst the hard coating is applied to parts of the window runners which will ensure correct guiding of the window and notably the parts which will work together with the sliding block fitted on some windows, notably those mounted in the window spaces of convex car doors.

The invention document also states that where the lip(s) and the heel or body of the weatherstrip are made of materials which have different degrees of hardness and elasticity, the lip (or the lips) should be more mouldable than the heel to ensure greater waterproofness. The connecting areas between the lip and the heel of the body should also be more elastically mouldable than the actual lip(s).

The sliding agent which is coated on the edge of the sealing lip or on certain parts of the weatherstrip is best applied on the edge of the lip or other parts when the device is manufactured by coextrusion of elastomers and/or plastomers, such as rubber or PVC of thermoplastic materials.

Alternatively this sliding coating could be applied by dipping or spraying by masking or pre-treating the areas not be be treated.

Other characteristics and advantages of the invention will become apparent in the following description which is given as an example and which refers to the illustrations in the appendix attached to this document and which are:

FIG. 3 is a cross section of a waterproofing device according to the invention, in this case applied to the window runners.

Figure 1:
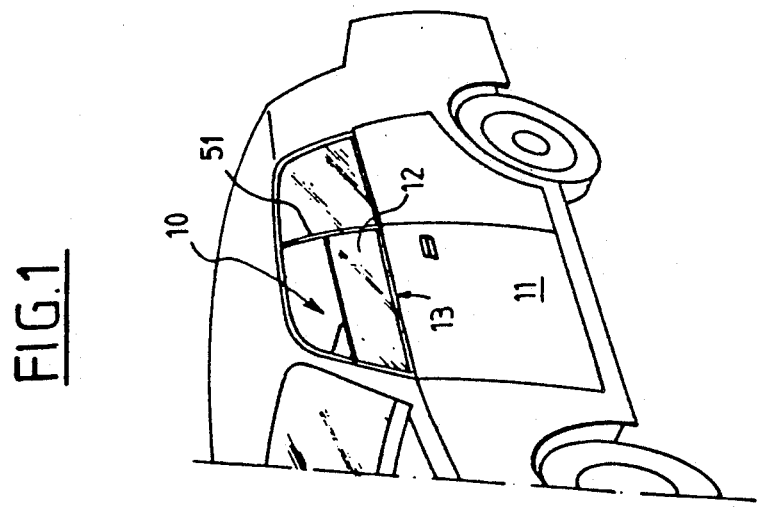
FIG. 1 is a partial view of part of a car body.

We shall initially refer to FIG. 1 which illustrates a "licker" running along the bottom of the window space 10 of a car door 11 which is closed by a sliding pane of glass 12, the glass being guided on each side by window runners 51 and working together with an upper runner (not shown) running parallel to the "licker" 13.

Figure 2:
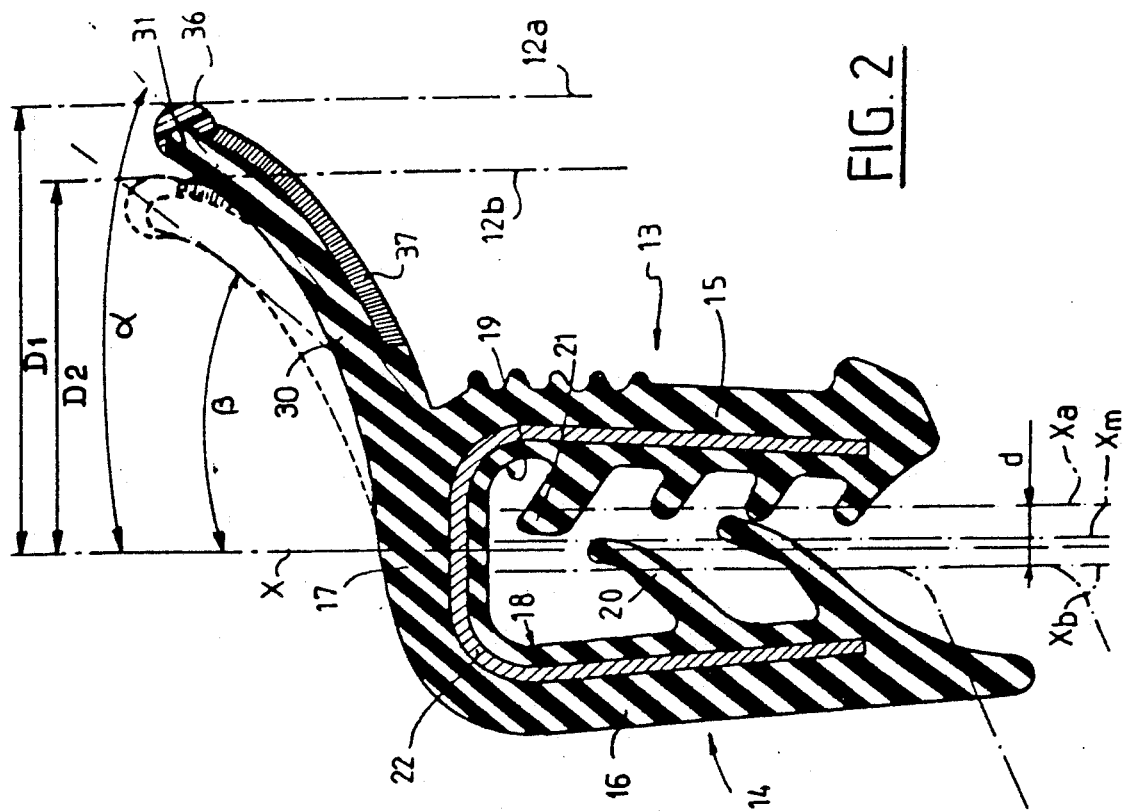
FIG. 2 is a cross section of a waterproofing device according to the invention in this case applied to the bottom of the pane of glass.

The latter, shown in FIG. 2, is essentially composed of a sealing lip 30 held by a $\pi$-shaped clamp or heel 14 with practically parallel "wings" 15 and 16 around a core 17. The "wings" 15 and 16 have projections or nervatures similar to 20 and 21 on their outer faces 18 and 19 respectively to allow fixing to the framework of the car door 11 (not shown). In the version described and illustrated, the heel 14 is fitted with a U-shaped weatherstrip, 22, preferably metallic, aluminium for example, which is coated in the material constituting the weathershield, an elastomer such as rubber or a plastomer such as PVC or a thermoplastic elastomer.

The invention also envisages the production of a waterproofing device made of more than one material, materials which differ in their properties of hardness. The clamp or heel 14 would thus be preferably made of a harder material than that used for the sealing lip.

According to the invention, the edge or extremity 31 of the lip 30 is evenly coated in a surface sliding agent 36 preferably made of a plastic material having a low coefficient of friction such as polyolefine for example or PTFE, whilst the lower surface of the lip is flock coated with a soft coating 37 enabling the smooth sliding of the window and retaining the dust.

The lip 30 is as long and as curved as the window is when it is completely lowered. It is fitted in the position shown by a bold line in FIG. 2, so that the perpendicular line X cuts through the core of the heel, i.e. parallel to the pane of glass and creating an angle $\alpha$ greater than 45 degrees, the edge being in contact with the pane of glass; however, as soon as the glass begins to move upwards the lip bends and approaches the X plane, as indicated by the dotted line; the lip 30 and this perpendicular line then form an angle $\beta$ of less than 45 degrees. This deformation is more pronounced on the vehicles where, in the course of closing up the window space, the glass pane moves transversally towards the "licker".

In FIG. 2 where 12$a$ and 12$b$ indicate the surface of the glass pane as it is positioned with respect to the "licker" when the glass is lowered and when it is closed respectively, the distances D1 and D2 indicate the distances of the pane of glass from axis X of the heel in these two positions and the positions of axes Xa and Xb indicate the positions of the axis of the driving mechanism corresponding to positions 12$a$ and 12$b$; Xm indicates the average position of this axis. In the case of flat glass the distance between Xa and Xb is equal to the distanced between the two furthest positions of the pane of glass, shown as flat for simplicity but which could also be convex.

Angles $\alpha$, $\beta$, the length, curvature and the suppleness of the lip 30 are established in such a way that the lip exerts minimum pressure on the glass but a pressure which is sufficient to ensure waterproofness and which is shared between the two coatings thus preventing premature wear of coating 37 and scratching of the glass by coating 36.

The body of the heel 14 should preferably be made of a material which is harder than its projections or nervatures 20, 21 and harder than the active part of the lip which itself should be supple enough to cope with any potential faults in the pane of glass or to cope with the degree of covexity of the glass.

We shall now refer to FIG. 3 which illustrates the structure of a weatherstrip according to the invention in this case applied to a single lip type window runner for car windows. It includes a base 54, a side 55 which is more or less perpendicular to the base 54 when the window runner is mounted on its frame (not shown), a short side 56, and a sealing lip 61 connected to the end of side 56. This window runner which is there to ensure correct movement of panes of glass fitted with sliding blocks (not shown) has a projection 67 fitted to the end of a column 70 which stands on the base 54 and is more or less parallel to the side 55 when the window runner is mounted and which is made of the same material as the projection. The beak 71 of projection 67 of this column, shown here in cross section, is the upper limit of movement of the sliding block and is more or less $\pi$-shaped. The window runner is also fitted with means allowing it to be clamped to the frame of the door, such as a projection 72 and a lip 62 which is an extension of lip 61 as well as a recess 81 and a projection 83. Column 56 which connected to the base 54 by means of a connecting part 74 also helps to fix the window runner to the door frame.

According to the invention, the part of the sealing lip 61 which is in contact with the pane of glass, in this case its upper part since it is a lip the concavity of which is directed as shown in FIG. 3, is coated with a layer of textile fibres or hairs to form a velvet-like coating, carried out by a process of flock coating, whilst the surface of base 54, the surfaces of column 70 and side 56 and the surface of projection 67, and generally all those parts which will come into contact with the sliding block in order to guide it up or down and/or which will come into contact with the pane of glass when it is fitted in the "coulisse" are coated with an even layer 92 of polyolefine or PTFE or another material, generally a plastic material which is resistant to wear by friction and provides good protection against water and air.

The "coulisse" described in the example only has one lip 61 which is fitted in such a way that the concavity is directed towards the base; however the invention is obviously not restricted to this particular kind of protection and may be applied to any kind of window runner intended to operate simultaneously with the sliding block of a car window and especially with the window runners described in the Patent Application which has two convex lips directed towards the base.

That which is claimed is:

1. A waterproof sealing strip for sealing a moveable glass pane of a vehicle, comprising a body including a pair of leg portions extending in opposing spaced apart relation to form a clamp for mounting the sealing strip to the vehicle, and a sealing lip normally projecting outwardly away from said body for engaging the surface of the pane, said sealing lip being formed of a resilient composition so as to flex from its normal orientation and sealingly engage the pane during movement of the pane, a relatively soft first surface coating extending over most of one surface of said sealing lip and positioned so as to be presented for engaging the face of the moveable glass panel when the lip is flexed from its normal orientation, and a relatively harder second surface coating contiguous with said first coating and extending only over the end portion of said sealing lip so that only the harder second surface coating is presented for engaging the pane when the lip is in its normal unflexed orientation, said first surface coating comprising a flock coating of textile fibers, and said second coating comprising a polytetrafluoroethylene or polyolefin polymer coating having a low coefficient of friction to assist in sliding movement of the glass pane.

2. A waterproof sealing strip according to claim 1 wherein said lip projects from the body at an angle such that the angle ($\alpha$) formed with the perpendicular line of the glass pane does not exceed 90 degrees and is preferably lower than 45 degrees when the glass is completely lowered and also in such a way that the angle ($\beta$) is greater than 45 degrees when the glass is raised.

3. A waterproof sealing strip for sealing a moveable glass pane of a vehicle, comprising a body including first and second leg portions extending in opposing spaced apart relation to form a clamp for mounting the sealing strip to the vehicle, a sealing lip projecting from said body near the extremity of said first leg which is connected to said second leg for engaging the surface of the pane, and a base member projecting from the other extremity of said first leg and including first and second projections forming with said base member a channel shaped configuration for engaging and guiding the edge of the pane, a relatively soft first surface coating extending over a major portion of one surface of said sealing lip for engaging the face of the moveable glass pane, and a relatively harder second surface coating located on the edge engaging surface portions of said base member, said first surface coating comprising a flock coating of textile fibers, and said second coating comprising a polytetrafluoroethylene or polyolefin polymer coating having a low coefficient of friction to assist in sliding movement of the glass pane.

4. A vehicle having a window opening and a moveable glass window pane mounted for sliding movement upwardly into the window opening from a lowered open position to a raised closed position, and in combination therewith, a waterproof sealing strip mounted along the bottom of the window opening for sealing the glass pane, said sealing strip comprising a body including a pair of leg portions extending in opposing spared apart relation to form a clamp for mounting the sealing strip to the vehicle, and a flexible resilient sealing lip projecting from said body for engaging the surface of the pane, a relatively soft first surface coating extending over most of one surface of said sealing lip for engaging the face of the moveable glass pane, and a relatively harder second surface coating contiguous with said first coating and extending only over the end portion of said sealing lip for also engaging the pane, said first surface coating comprising a flock coating of textile fibers, and said second coating comprising a polytetrafluoroethylene or polyolefin polymer coating having a low coefficient of friction to assist in sliding movement of the glass pane, and wherein said lip is so oriented in relation to the window opening that when the glass pane is completely raised to close the window opening only the end portion of said lip provided with said second harder coating comes into contact with said glass pane, whereas when the glass pane is completely lowered, at least a part of said soft flock coated portion comes into contact with the glass pane.

* * * * *